United States Patent [19]

Alpert

[11] Patent Number: 5,135,311
[45] Date of Patent: Aug. 4, 1992

[54] CONVECTIVE CALORIMETER APPARATUS AND METHOD

[75] Inventor: Seymour S. Alpert, Albuquerque, N. Mex.

[73] Assignee: University of New Mexico, Albuquerque, N. Mex.

[21] Appl. No.: 725,546

[22] Filed: Jul. 3, 1991

[51] Int. Cl.$^5$ .................... G01K 17/00; G01K 17/06; A61B 5/00
[52] U.S. Cl. ...................... 374/31; 128/736; 128/718; 374/34; 374/41
[58] Field of Search ................ 374/31, 32, 33, 34, 374/39, 40, 41; 128/736, 718

[56] References Cited

U.S. PATENT DOCUMENTS

| | | | |
|---|---|---|---|
| 3,365,944 | 1/1968 | Hoagland et al. | 374/34 |
| 3,593,577 | 7/1971 | Monnere | 374/34 |
| 4,178,800 | 12/1979 | Thomann | 374/33 |
| 4,386,604 | 6/1983 | Hershey | 374/31 |
| 4,482,006 | 11/1984 | Anderson | 374/41 |
| 5,040,541 | 8/1991 | Poppendiek | 374/31 |

FOREIGN PATENT DOCUMENTS

| | | | |
|---|---|---|---|
| 0055742 | 4/1983 | Japan | 374/31 |
| 2236190 | 3/1991 | United Kingdom | 128/736 |

OTHER PUBLICATIONS

Solomon, C. et al., "Dynamic Adiabatic Calorimeter: An Improved Calorimetric Apparatus," The Review of Scientific Instruments, vol. 35, No. 3, pp. 307-310 (Mar. 1964).
"A Linear Fick's Law Calorimeter" by Seymour S. Alpert et al., American Journal of Physics Teachers, vol. 50 No. 10; pp. 889-893 (1982).
"An Isothermic, Gradient-Free, Whole Body Calorimeter for Long-Term Investigations of Energy Balance in Man," by Tschegg et al., Metabolism, vol. 28, No. 7 (1978).
"Nouvelle Chambre Calorimetrique du Laboratore de bioenergetique" by A. Auguete et al., Comptes Renders des Seances de la Societe de Biologie et de ses Filiales, vol. 100 (1929).
Human Calorimeters, by Webb, P., pp. 1-165, Praeger Publishers (1985).
Animal and Human Calorimetry by J. A. McLean and G. Tobin; Cambridge University Press (1987); pp. 13-14.

Primary Examiner—William A. Cuchlinski, Jr.
Assistant Examiner—Diego F. F. Gutierrez
Attorney, Agent, or Firm—Donovan F. Duggan; Deborah A. Peacock

[57] ABSTRACT

A direct convective air flow calorimeter characterized by fast response time, high efficiency, and transient, as well as steady state, heat measurement capability. The calorimeter generally measures sensible and insensible heat losses, and may measure indirect heat losses as well. The calorimeter can be scaled to accommodate animal as well as human subjects. The convective calorimeter includes an adiabatic chamber wherein circulatory air flow is provided about the inner periphery of the chamber while baffles are used to shield the subject from the circulatory air flow. The chamber is also provided with ventilating air flow. Finally, sensors are used for determining the heat addition to the circulatory air flow, which represents the sensible heat loss from the subject being tested, and for determining selected properties of the ventilating air flow.

18 Claims, 4 Drawing Sheets

CONVECTIVE CALORIMETER APPARATUS AND METHOD

BACKGROUND OF THE INVENTION

1. Field of the Invention (Technical Field)

The invention relates to a convective air flow calorimeter and a method for its use.

2. Background Art

*Human Calorimeters*, by Webb, Praeger Publishers (1985), details and classifies a variety of devices for measuring the heat given off by an animal body. Such devices have previously been classified as direct (measuring entire heat loss) or indirect calorimeters, where only respiratory gas exchange was measured. Further, calorimeters have been classified by principle of operation, including flow (both air and water) calorimeters, gradient calorimeters, storage calorimeters, and calorimeters with compensating heaters.

In all cases, of course, the law of conservation of energy is maintained:

$$Q_{FD} + Q_{ST} = Q_{HL} + Q_{WK} + Q_{\Delta H} + Q_{FE} + Q_{UR} \quad (1)$$

where Q is energy quantity in food (FD), body fuel stores (ST), total heat loss (HL), external work (WK), changes in body heat content ($\Delta H$), feces (FE), and urine (UR).

In calorimetry, energy equation (1) is generally supplanted by the following:

$$M = \pm R \pm C \pm K + E + W \pm S \quad (2)$$

where M is heat production from metabolism; R, C, and K are heat exchanges by radiation, convection and conduction, respectively (or sensible heat); E is evaporative heat loss (or insensible heat); W is external work; and S is heat storage in the body.

The first air flow calorimeter was described in "Nouvelle Chambre Calorimétrique du Laboratoire de Bioénergétique," *Comptes Renders des Séances de la Société de Biologie et de ses Filiales*, by A. August and J. LeFèvre, Vol. 100 (1929). This calorimeter was described by the authors as a totally adiabatic and waterproof chamber wherein an "almost imperceptible" isothermal current of cold air was evenly distributed throughout the chamber by a series of orifices. The air was recirculated, cooled, heated, and purified. Air mass was measured, as was temperature increase. A small portion (20%) of water, carbon dioxide, and intenstinal gases was absorbed and measured. Condensation in the chamber was prevented by regulating the hygrometric state of the chamber. An endometer also provided respiratory and calometric measurements. An ergometer was provided to measure subject work.

"An Isothermic, Gradient-Free, Whole-Body Calorimeter for Long-Term Investigation of Energy Balance in Man", Tschegg et al., *Metabolism*, Vol. 28, No. 7, July, 1978, basically describes a modern form of the calorimeter described by Auguet and LeFèvre. It is noted that the Tschegg et al. calorimeter is an open (not circulatory) system, and the subject is unshielded from such open system flow.

Recent air flow calorimeters include those of Dauncey (Webb, supra, p. 95, et seq.) and Garby (Webb, supra, p. 126, et seq.). Dauncey's device, however, although denominated an air flow calorimeter, actually measures sensible heat as the change in water temperature across a heat exchanger.

Garby's air flow calorimeter apparently distributes circulating air by means of orifices in overhead pipes. Significantly, neither Dauncey nor Garby effectively shield the subject from recirculating air.

A linear disk-type calorimeter is described in *American Journal of Physics Teachers*, "A Linear Fick's Law Calorimeter," Vol. 50, No. 10, pp. 889–893, by Alpert, et al. (October 1982). Employing selectively heat-conductive metals, such as magnesium, the calorimeter described was a small, simple device suitable for measuring heat loss of small animals. Advantageously, this device has a fast response time.

SUMMARY OF THE INVENTION

Disclosure of the Invention

The present invention is of a method and apparatus for determining total heat loss from a subject. The invention comprises: an adiabatic chamber; providing circulatory air flow about the inner periphery of the adiabatic chamber; measuring heat addition to the circulating air flow; providing ventilating air flow to the adiabatic chamber; and measuring selected properties of the ventilating air flow.

In the preferred embodiment, the adiabatic chamber further comprises an inner chamber comprising walls, floor, and ceiling of insulating material and an insulating shell surrounding the inner chamber in spaced relationship. Measuring heat addition to the circulatory air flow comprises: maintaining a first temperature sensor at a reference temperature; measuring temperature change relative to the first temperature sensor by a second temperature sensor; and calculating heat addition from the temperature change. Providing circulatory air flow about the inner periphery of the adiabatic chamber is done preferably by means of a blower and baffle. Providing ventilating air flow to the adiabatic chamber is done preferably by mixer vent and pump. Measuring selected properties of the ventilating air flow (including $O_2$ and $CO_2$ content) is preferably done by mass flow meter and humidity sensor.

An object of the invention is the provision of a calorimeter having a fast response time and ease of calibration.

Another object of the invention is the provision of a calorimeter capable of transient, as well as steady state heat loss measurement.

Yet another object of the invention is the provision of a direct calorimeter having the capability of simultaneously measuring indirect heat production.

An advantage of the invention is that the operating temperature can be varied for both calibration and subject comfort.

Another advantage of the invention is that it is non-invasive regarding the subject.

Yet another advantage is that the invention can be scaled up or down to accommodate subjects of varying size (e.g., rats, humans, or horses).

Still another advantage of the invention is the provision of a calorimeter relatively easy to construct.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENTS

Figure 1:
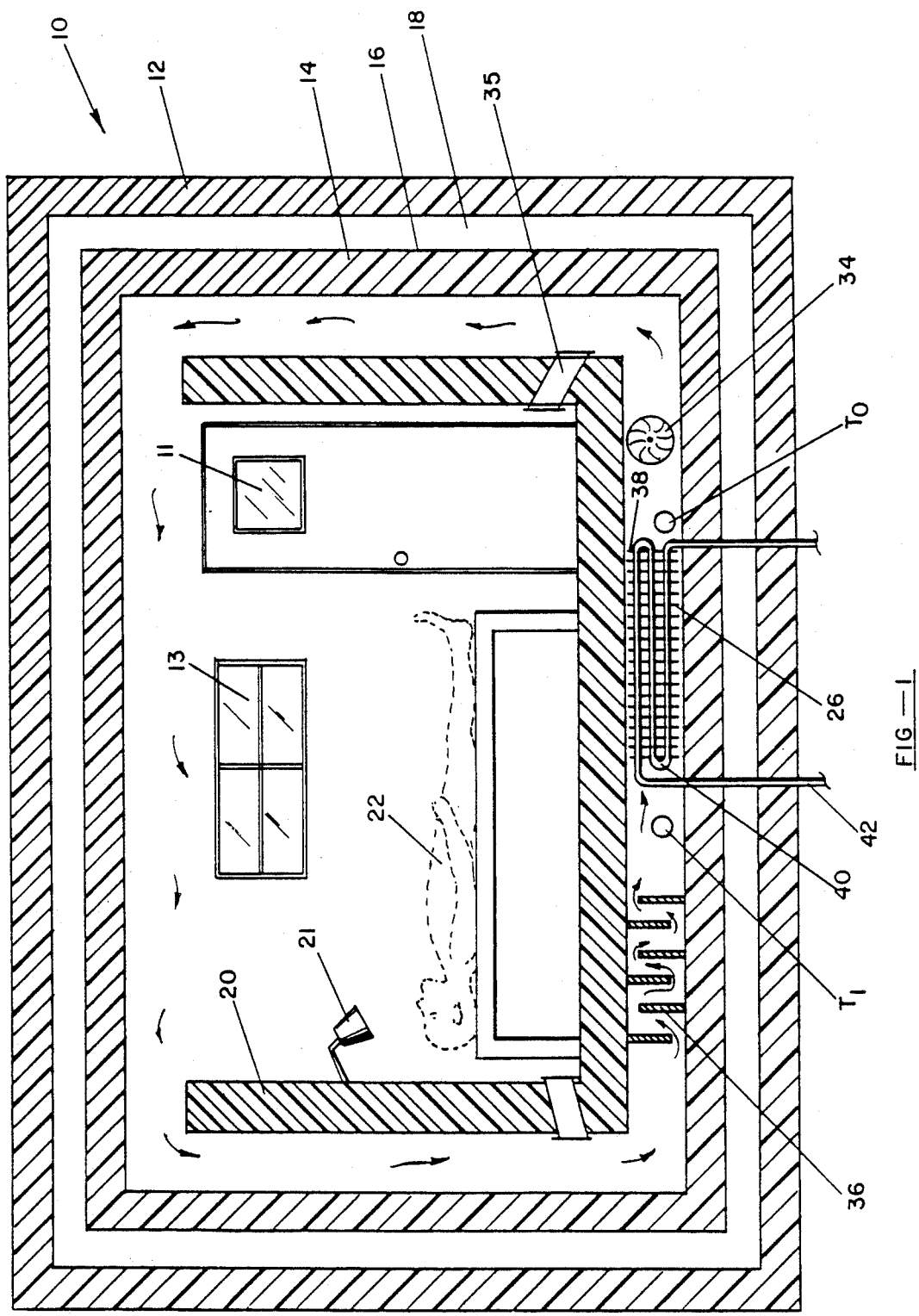
FIG. 1 is a side cross-section of the preferred calorimeter of the invention.

Best Modes for Carrying Out the Invention

Reference is now made to FIGS. 1-4, which show the preferred calorimeter 10 of the invention. Outer shell 12, in surrounding relationship to inner chamber 14, comprises 4" thick floor, ceiling and walls of THERMAX® (R=28.8). Inner chamber 14 likewise comprises a 4"-0 thick THERMAX® wall 16. An insulating interstitial space 18 of 6"-8" is provided between inner chamber 14 and outer shell 12. Space 18 is maintained at a pressure and temperature equal to that maintained in inner chamber 14. By thus eliminating pressure and temperature gradients between structure, inner chamber 14 is essentially adiabatic. (As used herein, "adiabatic" is defined as an absence of uncontrolled or unintended heat loss or gain from the calorimeter. Obviously, to adequately measure heat, external heat loss or gain is required.) Door 11 and window 13 are also provided as desired for subject access and viewing.

Figure 2:
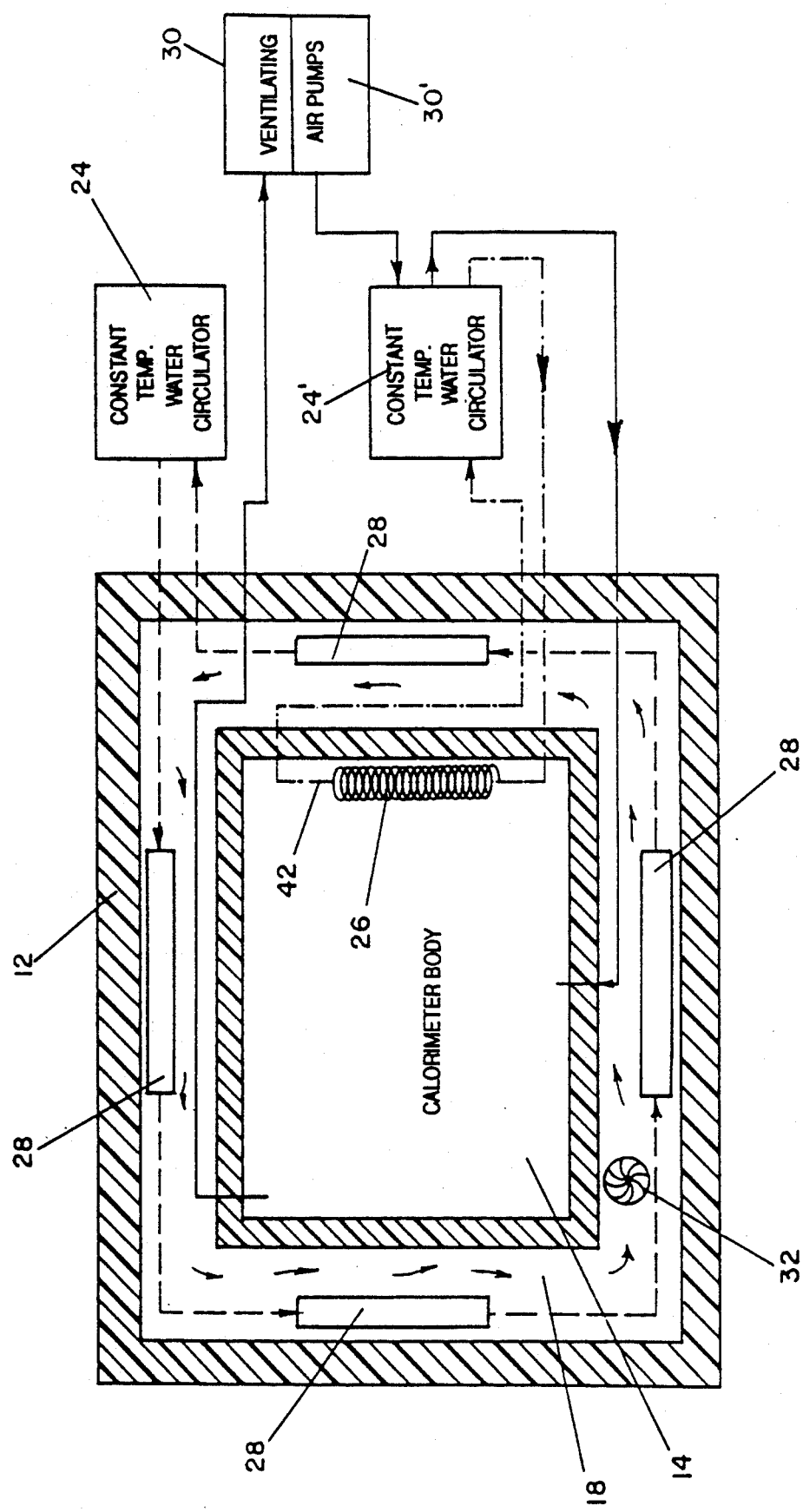
FIG. 2 is a schematic drawing of the operating systems of the preferred calorimeter of the invention.

FIG. 2 schematically illustrates the shell-inner chamber configuration of the calorimeter. Constant temperature water circulator ("HOT PAK ™") 24' maintains water circulation at constant temperatures to and from heat exchanger 26. Circulator 24 provides constant temperature water to a plurality of series connected heat exchangers 28 mounted about the inner periphery of shell 12 in space 18. Circulator 24' also maintains ventilation air in inner chamber 14 at constant input temperature. Ventilating air pumps 30,30' establish a relatively constant ventilating air flow rate of 100 L/min. The two pumps 30,30' maintain inner chamber 14 at ambient pressure and present leaks.

Impeller 32 in interstitial space 18 provides relatively constant air flow in the space.

Partitions 20 in inner chamber 14, also 4" thick and comprised of extruded polystyrene (R=20), effectively baffle and direct recirculating air (indicated by arrows), thereby shielding the subject or patient 22 from such recirculating air flow. Recirculating air is driven by impeller 34, in turn rotated by a synchronous motor (not shown) to provide a constant rate of flow in the range of 5,000-6,000 L/min.

The shielding of the patient from the recirculating air stream is unique in that is promotes patient comfort and "well being" while largely eliminating unwanted perturbations in heat transfer data.

Heat transfer between subject 22 and the recirculating air is primarily convective. While heat transfer between subject 22 and other objects in the chamber may be initially conductive or radiant heat transfer, ultimately all heat transfer to the recirculating air flow is convective.

Heat from subject 22 is effectively captured and entrained in the recirculating air flow. Assuming the temperature of the heat source or subject as the temperature of inner chamber 14, radiative and convective heat transfer rates can be combined into a single term, lending itself to the following equation:

$$Cd\theta_{ch}/dt = P - \alpha(\theta_{ch} - \theta_o) \qquad (3)$$

where C is the heat capacity of subject and chamber, P is the heat input rate of the subject, assumed constant, $\theta_{ch}$ is chamber temperature at a fixed point, and $\alpha$ is an unknown coefficient specifying heat transfer by convection and radiation (determined by experimentation) and $\theta_o$ is the controlled temperature of the calorimeter.

The solution of Eq(3) is:

$$\theta_{ch} = \theta_0 + [1 - exp(-\alpha t/C]P/\alpha. \qquad (4)$$

Eq. 4 indicates that calorimeter response time is directly proportional to total heat capacity and inversely proportional to coefficient $\alpha$.

FIG. 1 depicts this heat exchange relationship. Baffles 36 effectively create turbulent flow of the recirculating air prior to impinging upon temperature sensor $T_1$ (which measures $\theta_{ch}$). The now-turbulent recirculatig air transfers heat to fins 38 of heat exchanger 26. Fins 38 and serpentine heat exchanber body 40 are preferably comprised of highyl heat-conductive metals, such as copper, magnesium, and the like, faciliating heat exchange to constant temperature water flow conduit 42. Temperature sensor $T_0$ (indicating $\theta_0$) is mounted on heat exchanger body 26 and thus maintained at constant temperature.

Figure 3:
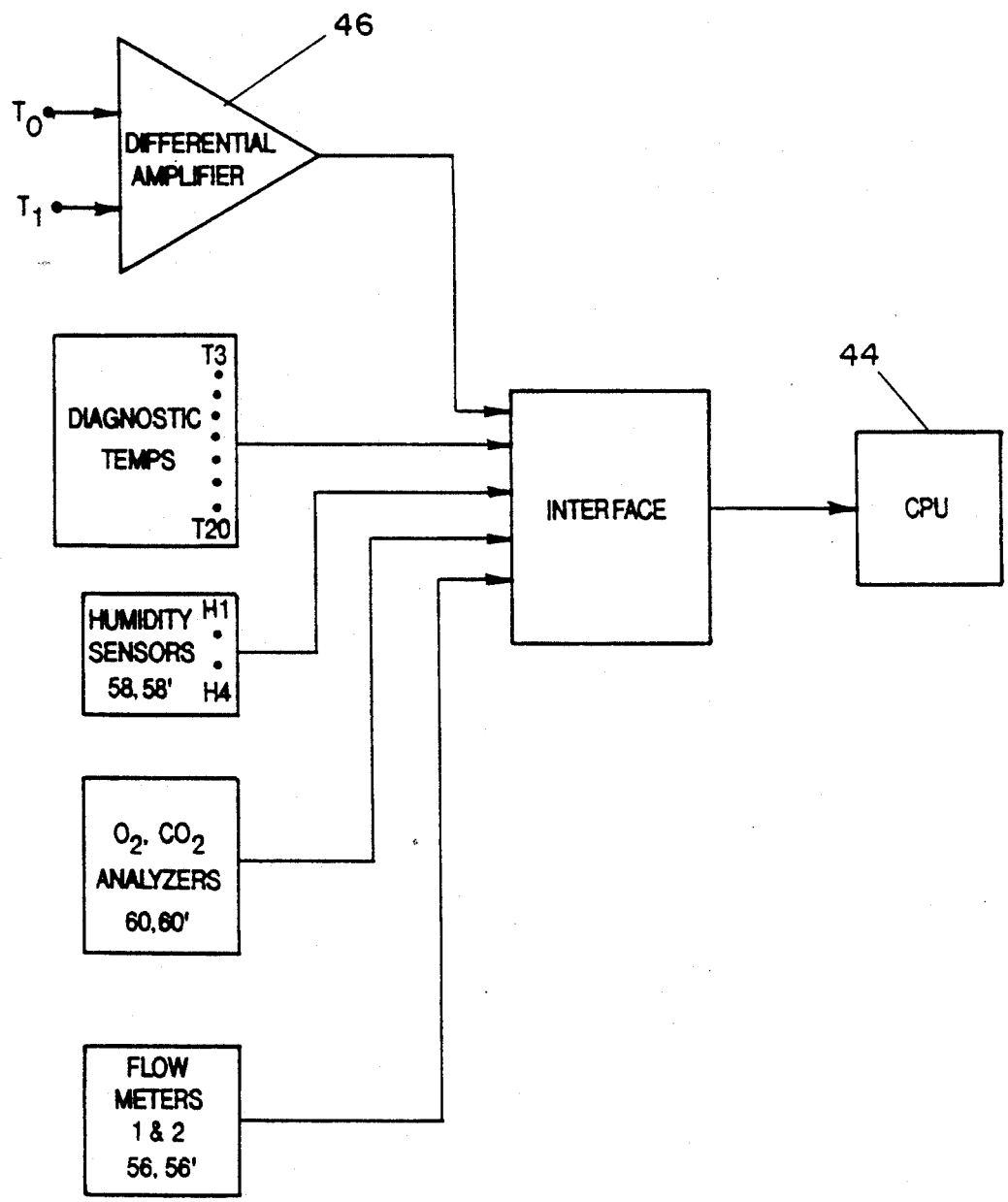
FIG. 3 is a schematic drawing of the electronic system of the invention.

In practice, $T_1$ and $T_0$ both comprise AD 590 temperature transducers or the like. Signals from these transducers are differentially amplified and input to CPU 44, as illustrated in FIG. 3. Other temperature sensors ($T_3$-$T_{20}$) may be input as desired.

Sensible heat loss may also then simply be calculated from the equation:

$$P_{sensible} = (V_{op} - V_{base})/conv, \qquad (5)$$

where $V_{op}$ is the output of differential amplifier 46, $V_{base}$ is the output when no subject or patient is present, and conv is the calibration factor determined by using several known values of heat source. $V_{base}$ is normally set close to zero; at 23° C., conv might be 42.75 mV/W.

Calculation of sensible heat emitted by a subject is best effected by repeatedly calibrating the calorimeter with a known heat source. For example, with a human subject, an illuminated 100-watt electric bulb would serve as a highly convenient heat source. Plotting a least-squares fit of various known power (watts) settings vs. responsee (volts) yields a family of accurate curves that are statistically acceptable, readily amenable to interpolation and extrapolation, and which provide ease of calibration.

Figure 4:
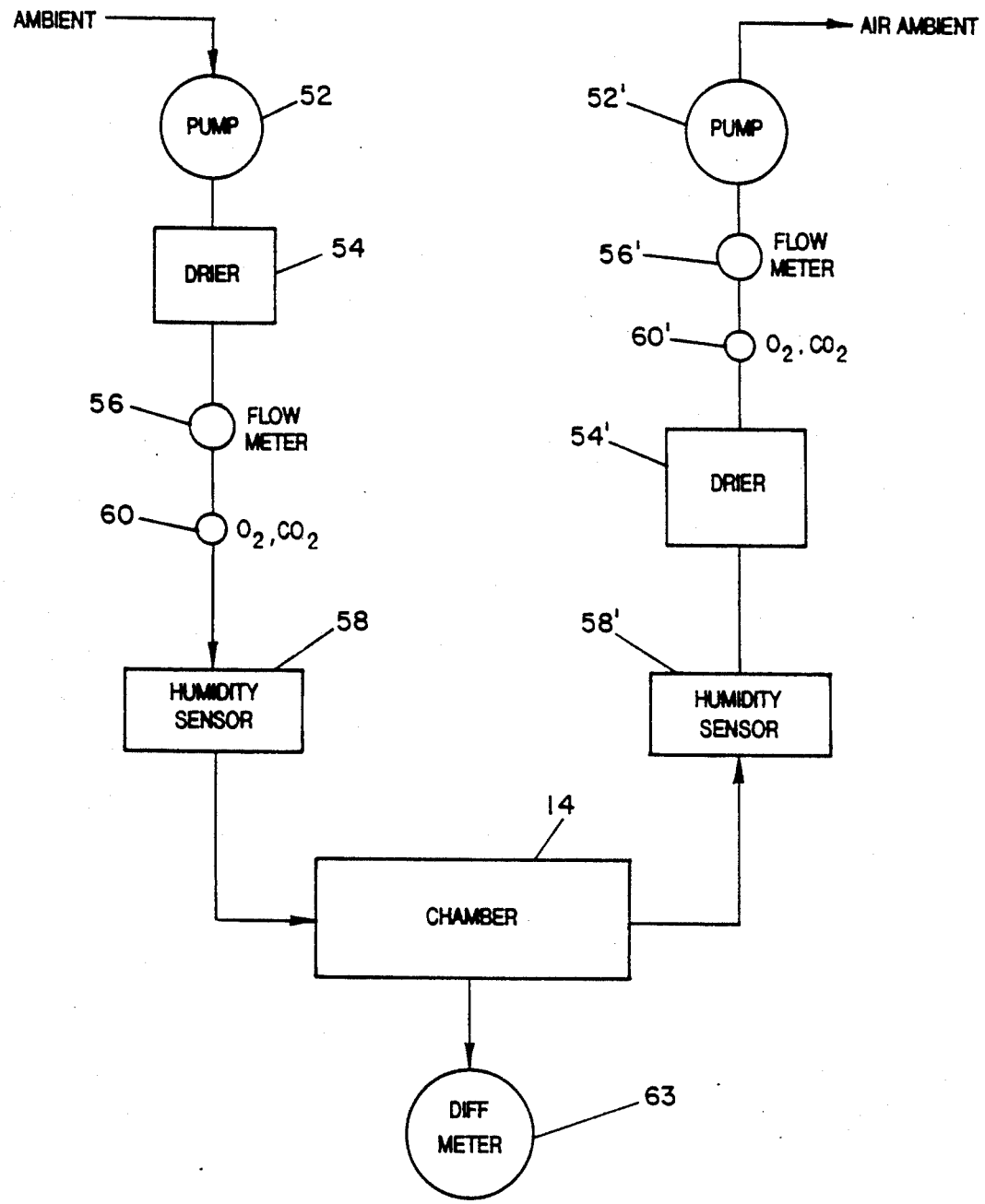
FIG. 4 is a schematic drawing of the ventilating air system of the invention.

Mixing vents 35 provide ingress (and egress) for ambient or ventilatin air. Primarily for subject respiratory utilization, ambient air is strictly monitored. Reference to FIG. 4 schematically indicates the flow of ambient or ventilation air. Pumps 52,52′ pressurize the incoming rate of flow at a constant 100 L/min and maintain the pressure differential at zero, as measured by differential meter 63. Driers 54,54′ remove a predetermined amount of moisture from ambient air, setting relative humidity at any desired percentage. Flow meters 56,56′ provide accurate incoming rate-of-flow data, while humidity sensors 58,58′ provide an accurate humidity reading of incoming ventilation air.

Immediately upon exiting inner chamber 14, humidity sensor 58′ provides a readout of ventilation air relative humidity. Also measured are $O_2$ and $CO_2$ content by sensors 60,60′ and mass flow rate by flow meter 56′. Pump 52′ imparts additional impetus to the exiting ventilation air. These measurements provide data concerning respiratory gas exchange and evaporative (insensible) heat loss.

Insensible heat loss is calculated according to the equation:

$$P_{insensible} = l(T_p) \cdot h(T_a) \cdot \Delta RH \cdot F \cdot CF \tag{6}$$

where $l(T_p)$ is the latent heat of vaporization at subject temperature, $T_p$; $h(T_a)$ is saturated absolute humidity at ambient temperature, $T_a$; $\Delta RH$ is the change in relative humidity of incoming and outgoing ambient or ventilation air; and CF a correction factor which reflects calibration, gas low conditions, and other conversion factors.

As an example:

$$l(37° C.) = 576 \text{ cal/gm}$$

$$h(23° C.) = 21.22 \times 10^{-6} \text{ gm/mL}$$

Tabular values reflecting values for l and h for other temperatures lend themselves to CPU storage in "look up" tables.

Mass flow rate is likewise subject to correction for other than standard temperature, and a corrention factor of T/273 is appropriate; a further correction for meter inaccuracy is also applicable. Similarly with $\Delta RH$, which is corrected for nonlinearity. These corrections to mass flow rate and $\Delta RH$ are incorporated into correction factor, CF.

$P_{insensible}$ can be determined to at least 5% accuracy. Since $P_{insensible}$ is approximately 0.15 $P_{sensible}$, total errors here are less than 1% of the total output.

Those ordinarily skilled in the art will appreciate that the preferred embodiment can be scaled up or down to accommodate subjects or patients of various sizes. For example, large farm animals could be so accommodated, as well as laboratory rats and human beings, in appropriately scaled calorimeters of the invention.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A convective calorimeter for measuring heat loss from a subject comprising:
   adiabatic chamber means;
   means providing circulatory air flow about the inner periphery of the adiabatic chamber means comprising baffle means shielding the subject;
   means for measuring heat addition to said circulatory air flow;
   means providing ventilating air flow to said adiabatic chamber means; and
   means for measuring selected properties of said ventilating air flow, wherein said heat addition to said circulatory air flow represents sensible heat loss from the subject.

2. The invention of claim 1 wherein said adiabatic chamber further comprises:
   inner chamber means comprising walls, floor, and ceiling of insulating material; and
   insulating shell means surrounding said inner chamber means in spaced relationship.

3. The invention of claim 1 wherein said means for measuring heat addition to said circulatory air flow comprises:
   first temperature sensor means maintained at a reference temperature means;
   second temperature sensor means measuring temperature change relative to said first temperature sensor means; and
   means for calculating said heat addition from said temperature change.

4. The invention of claim 1 wherein said means for providing circulatory air flow about the inner periphery of said adiabatic chamber means further comprises blower means.

5. The invention of claim 1 wherein means for providing ventilating air flow to said adiabatic chamber means comprises mixing vent means.

6. The invention of claim 1 wherein said means for providing ventilating air flow to said adiabatic chamber means further comprises pump means.

7. The invention of claim 1 wherein said means for measuring selected properties of said ventilating air flow comprises mass flow meter means.

8. The invention of claim 1 wherein said means for measuring selecting properties of said ventilating air flow further comprises humidity sensor means.

9. The invention of claim 1 wherein said means for measuring selected properties of said ventilating air flow further comprises means for measuring $O_2$ and $CO_2$ content.

10. A method of determining heat loss from a subject comprising the steps of:
    a) providing an adiabatic chamber;
    b) providing circulatory air flow about the inner periphery of the adiabatic chamber by providing baffle means shielding the subject;
    c) measuring heat addition to the circulatory air flow;
    d) providing ventilating air flow to the adiabatic chamber; and
    e) measuring selected properties of the ventilating air flow, wherein the step of measuring heat addition to the circulatory air flow represents sensible heat loss from the subject.

11. The method of claim 10 wherein the step of providing an adiabatic chamber further comprises the steps of:
    a) providing an inner chamber comprising walls, floor, and ceiling of insulating material; and
    b) surrounding the inner chamber by an insulating shell in spaced relationship.

12. The method of claim 10 wherein the step of measuring heat addition to the circulatory air flow further comprises the steps of:
 a) maintaining a first temperature sensor at a reference temperature;
 b) measuring temperature change relative to the first temperature sensor by a second temperature sensor; and
 c) calculating heat addition from the temperature change.

13. The method of claim 10 wherein the step of providing circulatory air flow about the inner periphery of the adiabatic chamber further comprises the step of providing blower means.

14. The method of claim 10 wherein the step of providing ventilating air flow to the adiabatic chamber further comprises the step of providing mixing vent means.

15. The method of claim 10 wherein the step of providing ventilating air flow to the adiabatic chamber further comprises the step of providing pump means.

16. The method of claim 10 wherein the step of measuring selected properties of the ventilating air flow further comprises the step of providing mass flow meter means.

17. The method of claim 10 wherein the step of measuring selected properties of the ventilating air flow further comprises the step of providing humidity sensor means.

18. The method of claim 10 wherein the step of measuring selected properties of the ventilating air flow further comprises the step of measuring $O_2$ and $CO_2$ content.

* * * * *